(12) United States Patent
Garcia

(10) Patent No.: US 12,162,411 B2
(45) Date of Patent: Dec. 10, 2024

(54) AGRICULTURAL WORK VEHICLE

(71) Applicant: CLAAS Tractor SAS, Velizy-Villacoublay (FR)

(72) Inventor: Rémi Garcia, Fontenay-Aux-Roses (FR)

(73) Assignee: CLAAS Tractor SAS, Vélizy-Villacoublay (FR)

( * ) Notice: Subject to any disclaimer, the term of this patent is extended or adjusted under 35 U.S.C. 154(b) by 812 days.

(21) Appl. No.: 17/340,869

(22) Filed: Jun. 7, 2021

(65) Prior Publication Data

US 2021/0402932 A1     Dec. 30, 2021

(30) Foreign Application Priority Data

Jun. 10, 2020    (DE) .......................... 102020115466.6

(51) Int. Cl.
| | | |
|---|---|---|
| *B60R 11/04* | (2006.01) | |
| *B60R 1/26* | (2022.01) | |
| *B60R 1/31* | (2022.01) | |

(52) U.S. Cl.
CPC ................ *B60R 11/04* (2013.01); *B60R 1/26* (2022.01); *B60R 1/31* (2022.01); *B60Y 2200/221* (2013.01)

(58) Field of Classification Search
None
See application file for complete search history.

(56) References Cited

U.S. PATENT DOCUMENTS

| | | | |
|---|---|---|---|
| 6,581,695 B2 | 6/2003 | Bernhardt et al. | |
| 9,783,112 B2 * | 10/2017 | Payne ..................... | A01C 7/102 |
| 10,351,061 B1 | 7/2019 | Chaudhari | |
| 11,770,991 B2 * | 10/2023 | Ohrstrom ........... | B62D 15/0295 |
| | | | 701/41 |
| 2002/0125018 A1 | 9/2002 | Bernhardt et al. | |
| 2002/0159270 A1 | 10/2002 | Lynam et al. | |
| 2007/0109807 A1 | 5/2007 | Lynam et al. | |

(Continued)

FOREIGN PATENT DOCUMENTS

| | | |
|---|---|---|
| DE | 102019201572 A1 | 9/2019 |
| EP | 1238577 A1 | 9/2002 |

(Continued)

OTHER PUBLICATIONS

European search report for European application No. 21170631.2-1004 mailed Nov. 2, 2021.

*Primary Examiner* — Jaime Figueroa
*Assistant Examiner* — Arslan Azhar
(74) *Attorney, Agent, or Firm* — Lempia Summerfield Katz LLC

(57) ABSTRACT

An agricultural work vehicle, such as a tractor, is disclosed. The agricultural work vehicle includes a cab that has a front window and an openable rear window opposite the front window that can be transitioned from a closed position to an open position, an attachment device for connecting a work unit to the agricultural work vehicle, and a camera system with a control unit that is configured to monitor the connecting process. The camera system includes at least one camera which is positioned on the rear window and directed toward the attachment device when the rear window is open. In this way, the at least one camera may provide images to an operator of the agricultural work vehicle during the connecting process.

20 Claims, 4 Drawing Sheets

(56) References Cited

U.S. PATENT DOCUMENTS

| | | |
|---|---|---|
| 2008/0186724 A1 | 8/2008 | Lynam et al. |
| 2008/0225538 A1 | 9/2008 | Lynam et al. |
| 2010/0045790 A1 | 2/2010 | Lynam et al. |
| 2012/0086808 A1 | 4/2012 | Lynam et al. |
| 2014/0226009 A1 | 8/2014 | Lynam et al. |
| 2016/0264052 A1 | 9/2016 | Lynam et al. |
| 2017/0297490 A1 | 10/2017 | Lynam et al. |
| 2019/0122382 A1* | 4/2019 | Fan .................... G01P 15/0802 |
| 2021/0114521 A1* | 4/2021 | Niewiadomski ..... G05D 1/0212 |

FOREIGN PATENT DOCUMENTS

| | | |
|---|---|---|
| ES | 2287266 T3 | 12/2007 |
| GB | 1160005 A | 7/1969 |

* cited by examiner

AGRICULTURAL WORK VEHICLE

CROSS-REFERENCE TO RELATED APPLICATION

This application claims priority under 35 U.S.C. § 119 to German Patent Application No. DE 102020115466.6 filed Jun. 10, 2020, the entire disclosure of which is hereby incorporated by reference herein.

TECHNICAL FIELD

The invention relates to an agricultural work vehicle, such as a tractor, that includes a camera system directed to an attachment device.

BACKGROUND

An agricultural work vehicle, such as a tractor, may include a cab that has a front window and a rear window that is opposite the front window and which may be opened, and which may be transitioned from a closed position into an open position by being pivoted on a pivot axis. The agricultural work vehicle may further include an attachment device for connecting a work unit to the agricultural work vehicle, as well as a camera system that is configured to monitor the connection process, such as disclosed in DE 10 2019 201 572 A1.

When connecting the work unit (e.g., an attachment device or a trailer attachment device to the agricultural work vehicle), a helper may stand between the agricultural work vehicle and the work unit to be connected in order to instruct a driver of the agricultural work vehicle during the connection process. This is particularly the case with a heavy attachment that cannot be moved by hand in order to compensate for an imprecise approach by the agricultural work vehicle and to mechanically connect coupling elements of the attachment device of the agricultural work vehicle to corresponding coupling elements of the attachment. In so doing, the helper is located in a hazardous area and in harm's way, wherein the danger of an accident rises with the increasing size of the agricultural work vehicle as well as the work unit due to the increasing lack of clarity.

DE 10 2019 201 572 A1 provides a camera system for the agricultural work vehicle that serves to monitor the connection process. For this, a camera holder to which a camera is attached is arranged in the rear section of the agricultural work vehicle on the chassis. The camera holder is positioned behind the cab between the fenders of the agricultural work vehicle.

An agricultural work vehicle is disclosed EP1238577A1 with a comparable camera system, wherein the camera positioned in the rear area of the agricultural work vehicle is attached to the cab roof above the attachment device.

DESCRIPTION OF THE FIGURES

The present application is further described in the detailed description which follows, in reference to the noted drawings by way of non-limiting examples of exemplary implementation, in which like reference numerals represent similar parts throughout the several views of the drawings, and wherein.

DETAILED DESCRIPTION

Figure 1:
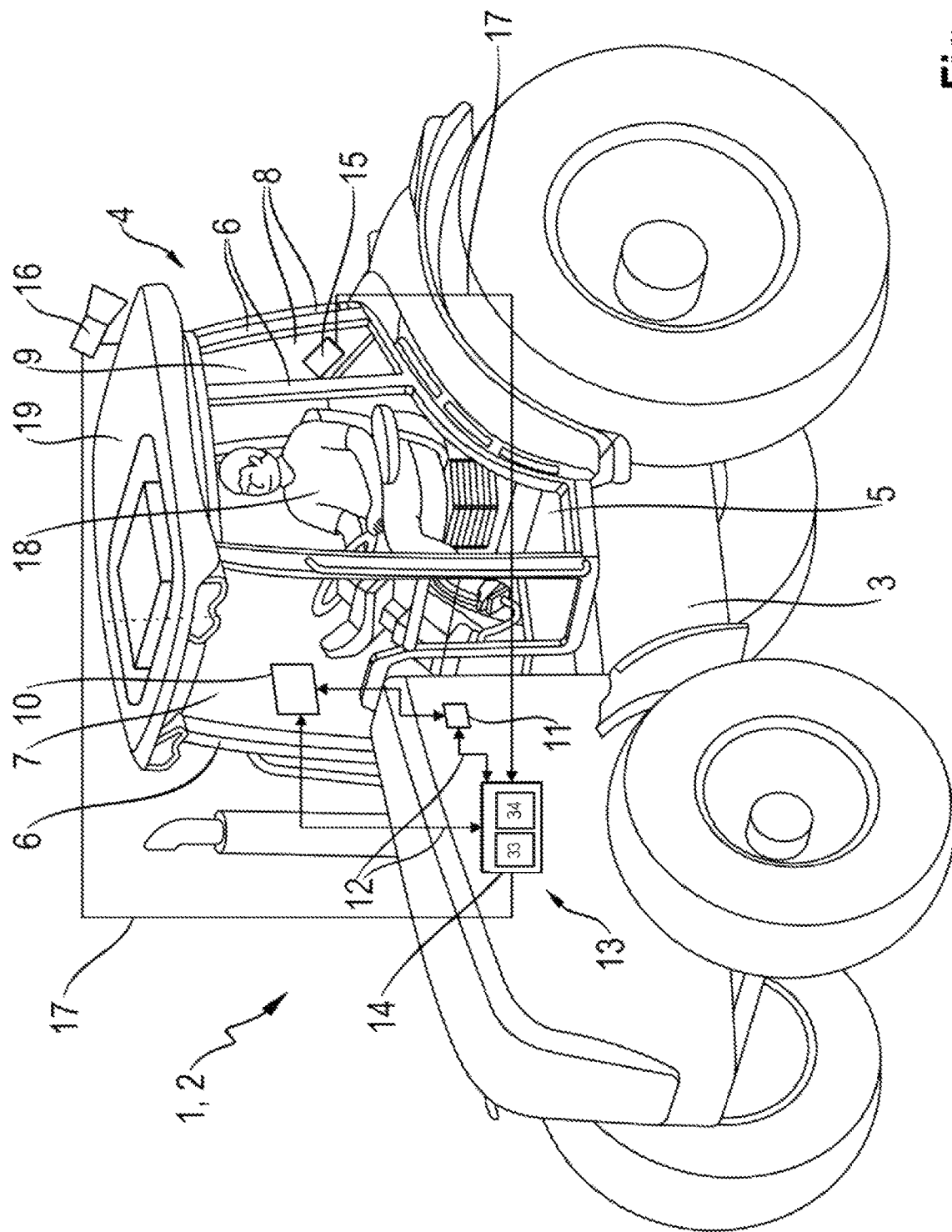
FIG. 1 schematically illustrates a perspective view of an agricultural work vehicle designed as a tractor having a camera system.

As discussed in the background, DE 10 2019 201 572 A1 discloses a camera system. The camera covers a field of vision to supply a picture that covers part of the attachment device and part of the work unit connection. For this, the camera has a tilt established by the camera holder of less than 90° relative to the vertical axis of the agricultural work vehicle. Similarly, for EP1238577A1, the field of vision of the camera is directed toward the ground, with the camera having a tilt less than 90° relative to the vertical axis of the agricultural work vehicle (i.e., the camera looks obliquely upward toward the attachment device).

A disadvantage of these camera systems is that the particular camera is directed toward the attachment device at a problematic angle which makes it difficult for the driver of the agricultural work vehicle, despite images provided by the camera, to monitor the connection process without an outside helper.

Thus, disclosed herein is an agricultural work vehicle of the aforementioned type that simplifies the coupling of a work unit to the agricultural work vehicle, in particular the monitoring of the connecting process, without a helper.

This may be solved with an agricultural work vehicle, such as a tractor, that comprises: a cab that has a front window and an openable rear window opposite the front window that can be transitioned from a closed position to an open position (such as by pivoting about a pivot axis); an attachment device for connecting a work unit to the agricultural work vehicle; and a camera system with a control unit that is configured to monitor the connection process.

In one or some embodiments, in order to simplify the monitoring of the connecting process, the camera system includes at least one camera which is arranged or positioned on the rear window, with this at least one camera being directed toward the attachment device when the rear window is open. In this regard, the position of the at least one camera is stationary and fixed relative to the rear window. Rather, the position of the at least one camera moves (along with the field of view of the at least one camera) as the rear window is moved. Arranging the camera on the rear window has, inter alia, the advantage that the camera is basically in a position directly above the attachment device when the rear window is open. Moreover, the camera is transferred into its monitoring position only as needed (e.g., by opening the rear window). Thus, the transfer or transitioning of the camera into its monitoring positioned is based on some triggering aspect (e.g., changing the state of at least one aspect of the cab, such as changing opening the rear window).

The attachment device may, for example, be a rear power lifter and/or a trailer hitch. A rear power lifter may be arranged at the rear on the agricultural work machine and for example may be designed in the form of a three-point power lifter. A trailer hitch may comprise any device for receiving an attachment, trailer or work unit. This may, for example, be a pin coupling, a draw hook, a drawbar, or a ball hitch. Other trailer hitches are contemplated.

In contrast to the disclosed arrangement of the camera, the camera of the camera system arranged fixedly on the camera holder according to DE 10 2019 201 572 A1 is always in the field of vision of the driver when he turns around to look out the rear window. Moreover, the camera holder and the camera arranged thereupon restrict the opening of the rear window. In contrast, the presently disclosed camera arrangement avoids such a disadvantage of the prior art by positioning the camera relative to the rear window (such as directly on the rear window). In particular, because the camera is positioned on the rear window, when the rear window is swung upward to be opened, the camera (positioned proximate to the rear window that pivots furthest outward from the cab) is less likely to obstruct the rear view of the driver while still being positioned to generate images of the connecting process.

In one or some embodiments, the at least one camera may be arranged or positioned on the inside of the rear window. That is, the camera is arranged or positioned on the side of the rear window facing the cab interior. This may protect the camera from outside influences. In particular, no special encapsulation may be necessary to protect the camera from moisture as is necessary with an arrangement outside of the cab. The costs of the arrangement and design of the camera may therefore be reduced.

In particular, the pivoting movement of the rear window may be restricted by at least one limiting means, such as an adjustable limiting means. In the simplest case, a frame element of the cab or at least one elastic damping element arranged or positioned on a frame element may serve as a stop. In this case, the distance from the damping element to the frame element may be changed. A limiting means may, for example, also be at least one gas pressure spring that supports the outward pivoting of the rear window and simultaneously limits the path of adjustment. In one or some embodiments, at least two gas pressure springs may be provided that are arranged on vertical frame elements of the cab and the rear window. The at least one adjustable limiting means may thus make it possible to specify a defined end position of the rear window.

In one or some embodiments, the image axis of the at least one camera is oriented perpendicular or nearly perpendicular to the attachment device when the rear window is in open position. In this way, the driver may be provided a birds-eye view of the attachment device, which simplifies the monitoring of the connecting process, such as the movement process when coupling elements of the attachment device of the agricultural work vehicle approach corresponding coupling elements of the attachment. Further, the image axis of the at least one camera is oriented parallel or nearly parallel to the ground when the rear window is in closed position. In this case, the at least one adjustable limiting means may, for example, serve to set the nearly perpendicular orientation of the camera relative to the attachment device, or adjust it if necessary. To this end, the camera may be pivotably arranged on the rear window about an axis parallel to the pivot axis of the rear window. The image axis and therefore the position of the image capture area may be readjusted by the pivotable arrangement of the camera.

In one or some embodiments, the at least one camera may be designed as a 2D camera or as a 3D camera. In particular, designing the camera as a 3D camera or stereo camera has the advantage that the height of the coupling elements may also be determined by the at least one camera.

In one or some embodiments, the control unit may be configured to turn on the at least one camera by opening the rear window and to turn it off by closing the rear window. This allows the turning on and off of the at least one camera to be automated. In this regard, the control unit may be triggered to turn on and/or off based on one or more inputs based on a configuration of at least a part of the cabin, such as the rear window of the cabin.

In particular, the camera system may include a display device arranged or positioned in the cab, wherein the control unit of the camera system is configured to control the display device in order to display the images (e.g., a series of still images or video) received by the at least one camera arranged or positioned on the rear window. This makes it possible for the driver to turn back toward the driving direction after opening the rear window so that the driver may work facing the control elements of the agricultural work vehicle, such as the steering wheel as well as the control elements for actuating the attachment device in the process of connecting the agricultural work vehicle to the work unit. This is more ergonomic for the driver and also increases operational reliability.

In one or some embodiments, the control unit may be configured to control the display device to display the images received by the at least one camera arranged or positioned on the rear window depending on one or more aspects of the rear window, such as one or both of passing a threshold for a pivot angle of the rear window, or a distance value of the rear window to a frame element of the cab. The controlling of the display device may therefore be associated with the degree of opening the rear window. This may prevent only a partial opening the rear window, for example to ventilate the cab, to cause the display device to switch to showing the images from the camera.

It may be particularly advantageous if, after closing the rear window, the control unit is configured to control the display device to return to a display shown before the rear window was opened, and/or to display received pictures from another camera of the camera system. Accordingly, the driver may be shown the display of a previous operating or work process that was shown to the driver before the connecting process without having to reselect this display. Alternatively or in addition, the display device may be controlled to display received pictures from another camera of the camera system.

In one or some embodiments, the control unit of the camera system may be configured to control the display device depending on the type of work unit connected to the agricultural work vehicle in order to change to an operation display specific to the adjustment and/or the operation of the work unit after closing the rear window. This may increase operating comfort. To accomplish this, the control unit may, for example, receive information on the work unit through a bus system of the agricultural work vehicle and/or the work unit in order to engage in a corresponding actuation. This information may, for example, be provided by a control device of the agricultural work machine and/or a control device of the work unit.

In particular, an actuating means may be arranged or positioned on the rear window to unlock and lock the rear window. Various devices may be used in order to sense a position of the actuating means. As one example, a least one sensor may be configured to sense at least one aspect of the window, such as detecting the opening and/or closing of the rear window (e.g., the sensor detects the opening and/or closing of the rear window and generates a signal indicative thereof), with the sensor in communication with the camera system in order to provide the sensed at least one aspect of the window. The actuating means may comprise a handle as well as a locking element that may be pivoted by the handle about an axis. The locking element may be brought into engagement with the frame element against which the rear window lies when in a closed position.

In one or some embodiments, the at least one sensor comprises a contact sensor and/or proximity sensor. In this way, the opening and closing of the rear window may be detected, and a corresponding signal may be transmitted to the control unit for evaluation in order to correspondingly control the camera arranged on the rear window, as well as the display device. The passing of a threshold for the distance value of the rear window relative to the cab frame may be determined using the sensor designed as a proximity sensor.

Alternatively or in addition, the at least one sensor comprises a rotary sensor for detecting the pivoting of the rear window. The passing of a threshold for a pivot angle of the rear window may be determined using the rotary sensor. Accordingly, the display device may be controlled more precisely by the control unit. In one or some embodiments, the display may only be switched to show the images received from the at least one camera arranged on the rear window when the operating situation of connecting the agricultural work vehicle and work unit is present (e.g., the agricultural work vehicle and work unit are in the process of connecting). In this way, a distinction can be made between only partially opening the rear window and completely opening the rear window.

Moreover, in one or some embodiments, at least one additional camera may be arranged or positioned on the roof of the cab that detects the rear area of the agricultural work vehicle independent of the camera on the rear window. Using the other camera, the nature or the type of the work unit may, for example, be identified. Moreover, the other camera may serve to monitor the rear area of the agricultural work vehicle and the work unit connected to the agricultural work vehicle.

Referring to the figures, FIG. 1 schematically shows an agricultural work vehicle 1 in the form of a tractor 2 in a perspective view, wherein the basic design of such a tractor is considered to be known by a person skilled in the art. The tractor 2 includes many chassis parts that are arranged on a vehicle frame 3.

A cab 4 which may be designed as partly or entirely enclosed is provided to house a driver 18. The cab 4 is arranged or positioned on the vehicle frame 3 of the tractor 2. The cab 4 includes a cab floor 5 by which it is arranged on the vehicle frame 3. Moreover, the driver's cab 4 includes a cab frame with frame elements 6 to which a front window 7, side windows 8 and a rear window 9 opposite the front window 7 are attached. The rear window 9 can be transitioned from a closed position into an open position and vice versa by pivoting about a pivot axis 27 running (see FIG. 3) parallel to the cab roof 19. When the rear window 9 is in the open position, the rear window 9 extends substantially parallel to the cab roof 19. When the rear window 9 is in the closed position, the rear window 9 extends substantially perpendicular to the cab roof 19 and lies against the frame elements 6.

In one or some embodiments, a display device 10 is arranged within the driver's cab 4.

The display device 10 may have input means and/or output means (e.g., a touch screen, speakers, or the like) for the driver 18 to interact with a control device 11 designed as an operating and control system to operate and control the agricultural work vehicle 1, or respectively the tractor 2. In this regard, the display device 10 may be designed as a touch-sensitive display, or have additional input means such as a keyboard, a multifunctional handle, buttons and switches, or the like. The control device 11 is connected to the display device 10 by a bus system 12. The control device 11 is part of an apparatus for controlling and monitoring different work settings of the tractor 2. To do this, the control device 11 is connected in a manner known per se to work aggregates, sensors and operating apparatuses of the tractor 2 which are not shown here in greater detail. Though, as discussed further below, control device 11 may include processing functionality, such as at least one processor 33 and at least one memory 34 (not shown), discussed below.

The tractor 2 moreover includes a camera system 13 with a control unit 14 and at least one camera 15. The at least one camera 15 is arranged or positioned on the rear window 9 and is configured to record images 32, such as to continuously record images 32. In one or some embodiments, the at least one camera 15 is arranged or positioned on the inside of the rear window 9. This protects the camera 15 from the effects of the weather, thereby requiring less effort in designing the camera housing for encapsulation. The camera 15 is connected by wireless or wired communication means 17 to the control unit 14. The at least one camera 15 may be designed as a 2D camera or as a 3D camera. Moreover, the camera system 13 may include another camera 16 that is arranged on or attached to the cab roof 19 and faces the rear area of the tractor 2. The other camera 16 may record the rear area of the agricultural work vehicle 1 independent of the camera 15 on the rear window 9.

The control unit 14 can be connected by the bus system 12 to the control device 11 of the tractor 2. Control unit 14 may comprise any type of computing functionality, such as at least one processor 33 (which may comprise a microprocessor, controller, PLA, or the like) and at least one memory 34. The memory may comprise any type of storage device (e.g., any type of memory). Though the processor 33 and memory 34 are depicted as separate elements, they may be part of a single machine, which includes a microprocessor (or other type of controller) and a memory.

The processor 33 and memory 34 are merely one example of a computational configuration. Other types of computational configurations are contemplated. For example, all or parts of the implementations may be circuitry that includes a type of controller, including an instruction processor, such as a Central Processing Unit (CPU), microcontroller, or a microprocessor; or as an Application Specific Integrated Circuit (ASIC), Programmable Logic Device (PLD), or Field Programmable Gate Array (FPGA); or as circuitry that includes discrete logic or other circuit components, including analog circuit components, digital circuit components or both; or any combination thereof. The circuitry may include discrete interconnected hardware components or may be combined on a single integrated circuit die, distributed among multiple integrated circuit dies, or implemented in a Multiple Chip Module (MCM) of multiple integrated circuit dies in a common package, as examples.

Figure 2:
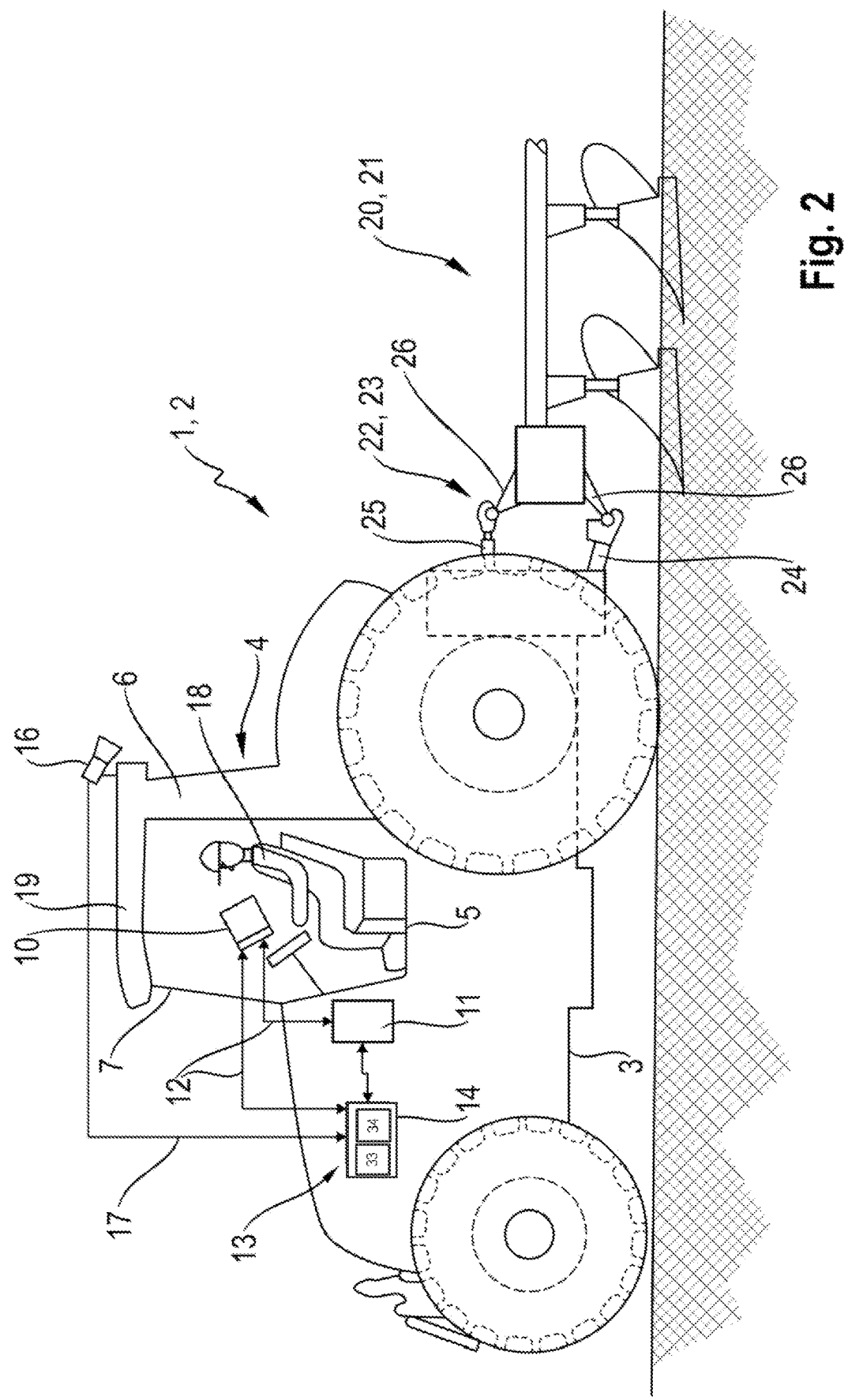
FIG. 2 schematically illustrates a side view of an agricultural work vehicle with a work unit that is connected by an attachment device to the agricultural work vehicle.

FIG. 2 schematically shows a side view of the agricultural work vehicle 1 with a work unit 20 that is connected by an attachment device 22 to the agricultural work vehicle 1. The attachment device 22 is designed in the depicted embodiment as a three-point rear power lifter 23. Other types of attachment devices are contemplated. For connecting or coupling to the work unit 20, the three-point rear power lifter 23 has two lower links 24 and one upper link 25 as coupling elements. Corresponding coupling elements 26 are arranged on the work unit 20 that can be brought into engagement with the lower links 24 and the upper link 25 in order to couple the work unit 20. In the depicted embodiment, the work unit 20 is designed as a plow 21 merely by way of example. Any type of work unit 20 is contemplated which, for example, may be connected as a pin coupling, a draw hook, a drawbar, or a ball hitch to the agricultural work vehicle 1 or respectively the tractor 2 using the attachment device 22 that may also be designed as a trailer hitch. In so doing, the work unit 20 may have its own control device for controlling and monitoring different work settings.

Figure 3:
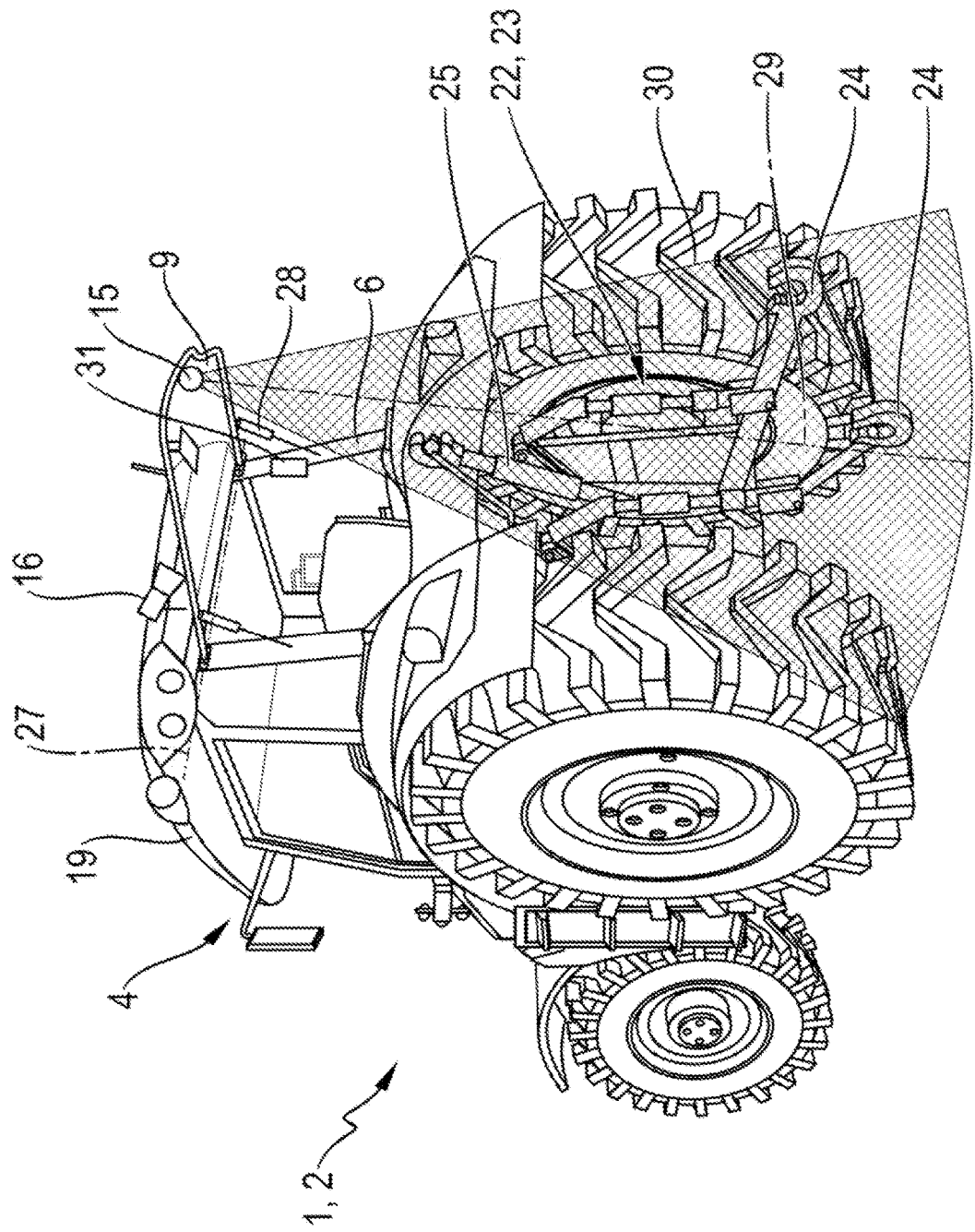
FIG. 3 illustrates a perspective view of the agricultural work vehicle obliquely from the rear.

FIG. 3 illustrates a perspective view of the agricultural work vehicle 1 obliquely from the rear. The rear window 9 is in its open position. In one or some embodiments, to open and limit the pivoting movement of the rear window 9, at least one adjustable limiting means 28 is provided. In the simplest case, a frame element 6 of the cab 4 or at least one elastic damping element arranged or positioned on the cab frame may serve as a stop. The limiting means 28 may also be at least one gas pressure spring that supports the outward pivoting of the rear window 9 and simultaneously limits the path of adjustment. In one or some embodiments, at least two limiting means 28 designed as gas pressure springs may be positioned on vertical frame elements 6 of the cab 4 and the rear window 9. In one or some embodiments, the limiting means 28 may be designed as adjustable, which allows an adjustment of the end stop position of the rear window 9 to be performed.

The camera 15 is positioned on the inside of the rear window 9 such that the camera 15 is oriented (such as generally oriented) toward the attachment device 22, 23 in the shown open position of the rear window 9. In particular, the camera 15 is positioned on a portion of the rear window 9 and angled such that the image axis of the camera 15 is such that it is positioned downward when the rear window is in the open position. The arrangement on the inside of the rear window 9 moreover has the advantage that the visibility of the objective of the camera 15 is not affected by the rear window 9 itself, which might be the case in a camera placement on the outside of the rear window 9. The image axis is identified with 29, and the substantially conical image capture area of the camera 15 is identified with 30. According to one or some embodiments, the image axis 29 of the camera 15 when the rear window 9 is in the open position is oriented perpendicular or nearly perpendicular to the attachment device 22, 23. The position of the rear window 9, and with it that of the camera 15, may be readjusted if necessary by the limiting means 28 that may be designed as adjustable, so that the image axis 29 of the camera 15 may remain oriented nearly perpendicular to the attachment device 22, 23 when the rear window 9 is in the open position. Conversely, the image axis 29 of the camera 15 may be oriented at an angle other than perpendicular to the attachment device 22, 23 when the rear window 9 is in the closed position (e.g., horizontal or nearly horizontal to the attachment device 22, 23 when the rear window 9 is in the closed position). Alternatively, the camera 15 may be pivotably arranged or positioned on the rear window 9 about an axis parallel to the pivot axis 27 of the rear window 9. The image axis 29, and therefore the position of the image capture area 30, may be readjusted by the pivotable arrangement of the camera 15.

An actuating means (not shown) for unlocking and locking the rear window 9 is positioned on the rear window 9. Various actuating means are contemplated. Merely by way of example, the actuating means may comprise a handle. To detect the opening and/or closing of the rear window 9, at least one sensor 31 is provided that is in communication via the communication means 17 to the control unit 14 of the camera system 13 in order to transmit one or more signals to the control unit 14 of the camera system. Various types of communication means 17 are contemplated, including wired and/or wireless communication methodologies, as well as different standards of communication methodologies.

The at least one sensor 31 may be designed as a contact sensor and/or a proximity sensor. In this way, the at least one sensor may generate sensor data indicative of whether the rear window 9 is open and/or closed. Specifically, the control unit 14 may analyze the sensor data generated by the at least one sensor in order to determine if the rear window 9 is swung out to be opened and/or swung down to be closed. It is also contemplated for the at least one sensor 31 to be designed as a rotary sensor for detecting the pivoting of the rear window 9 about the pivot axis 27. The opening and closing of the rear window 9 may thus be detected using the at least one sensor 31. Since the opening of the rear window 9 may also serve to ventilate the cab 4 and the rear window 9 may be swung out only partially (but not entirely) for this purpose. Thus, in one or some embodiments, the at least one sensor may generate sensor data indicative so that the control unit 14 may identify the position in which the swung out rear window 9 is located. Specifically, the control unit 14 may evaluate the signals indicative of the sensor data that are provided by the sensor 31, which as discussed above may be designed as a proximity sensor or rotary sensor.

The control unit 14 is configured to detect the opening and closing of the rear window 9. In response to the control unit 14 detecting, based on the sensor data, the opening and/or closing of the rear window 9, the control unit 14 is configured to turn on the at least one camera 15 (responsive to detecting the rear window 9 opening), and/or to turn it off from the rear window 9 closing (responsive to detecting the rear window 9 closing). Alternatively, or in addition, the control unit 14 is configured to control the display device 10 connected to the control unit 14 in order to display the images 32 received from the at least one camera 15 positioned on the rear window 9, as for example illustrated in FIG. 4.

The control unit 14 may be configured to control the display device 10 to display the images 32 received from the at least one camera 15 arranged on the rear window 9 depending on the control unit 14 determining (based on the sensor data) at least one aspect of the rear window 9, such as the passing of a threshold for a pivot angle of the rear window 9, or a distance value of the rear window 9 to a frame of the cab 4. Accordingly, in one or some embodiments, the control unit 14 is not configured to cause the display device 10 to switch in order to display images 32 received from the camera 15 responsive to the control unit 14 determining that the rear window is merely partially swing out (but not entirely swung out). Likewise, in one or some embodiments, the control unit 14 is not configured to activate the camera 15 when the rear window 9 is only partially swung out (but not entirely swung out). Thus, the control unit may be configured to control one or both of the at least one camera or display of images generated by the at least one camera based on a pivot position of the rear window (e.g., whether pivoted entirely in the open position or not).

Moreover, after closing the rear window 9, the control unit 14 may determine, based on the sensor data, that the rear window 9 has been closed, and responsive thereto, the control unit 14 may be configured to control the display device 10 to return to a display shown before the rear window 9 was opened by the display device 10, and/or to display received pictures from the other camera 16 of the camera system 13 arranged on the cab roof 19. This may be done by the display device 10 being controlled directly by the control unit 14, or indirectly by the control device 11. In the latter case, the control unit 14 may transmit a status signal to the control device 11 that contains the information on the shutting off of the camera 15. Responsive to receiving the status signal, the control device 11 then controls the display device 10 depending on this status signal.

Moreover, the control unit 14 may be configured to control the display device 10 depending on the type of work unit 20 connected to the agricultural work vehicle 1 in order to change to an operation display specific to the adjustment of the work unit 20 after closing the rear window 9. That is, after the work unit 20 is connected to the agricultural work vehicle 1, the driver 18 may normally close the rear window 9, which is detected by the at least one sensor 31.

If the type of coupled attachment device 22 may be identified by the control device 11, the control device 11 may transmit a corresponding signal to the control unit 14, which then controls the display device 10 in order to display the specific operating display (based on the identified type of coupled attachment device 22) for adjusting of the work unit 20.

Figure 4:
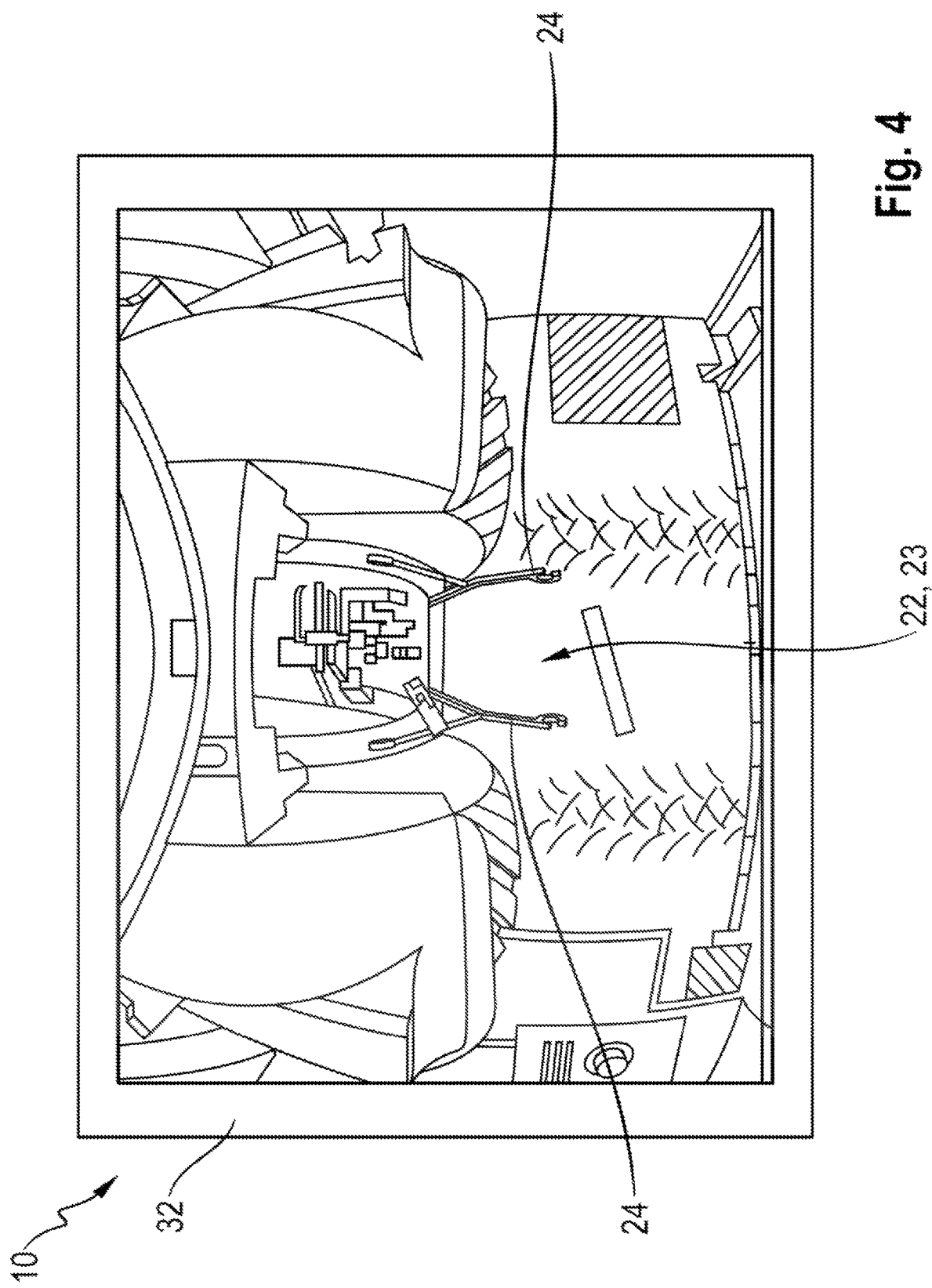
FIG. 4 illustrates a reproduction of an image received from a camera of the camera system on the display device of the agricultural work vehicle.

FIG. 4 shows a reproduction of an individual image 32 received from the camera 15 of the camera system 13 on the display device 10 of the agricultural work vehicle 1 or the tractor 2. The image 32 received from the camera 15 shows the attachment device 22, 23 in a birds-eye view. If the tractor 2 approaches the work unit 20 to be coupled, the coupling elements 26 of the work unit 20, 21 also enter the image capture area 30 of the camera 15 and would be correspondingly shown in a birds-eye view in the context of the image sequence received from the camera 15, which simplifies the process of connecting the agricultural work vehicle 1 and the attachment 20.

Further, it is intended that the foregoing detailed description be understood as an illustration of selected forms that the invention can take and not as a definition of the invention. It is only the following claims, including all equivalents, that are intended to define the scope of the claimed invention. Further, it should be noted that any aspect of any of the preferred embodiments described herein may be used alone or in combination with one another. Finally, persons skilled in the art will readily recognize that in preferred implementation, some, or all of the steps in the disclosed method are performed using a computer so that the methodology is computer implemented. In such cases, the resulting physical properties model may be downloaded or saved to computer storage.

LIST OF REFERENCE NUMBERS

1 Work vehicle
2 Tractor
3 Vehicle frame
4 Cab
5 Cab floor
6 Frame element
7 Front window
8 Side window
9 Rear window
10 Display device
11 Control device
12 Bus system
13 Camera system
14 Control unit
15 Camera
16 Camera
17 Communication means
18 Driver
19 Cab roof
20 Work unit
21 Plow
22 Attachment device
23 Three-point rear power lifter
24 Lower link
25 Upper link
26 Coupling element
27 Pivot axis
28 Limiting means
29 Image axis
30 Image capture area
31 Sensor
32 Image
33 Processor
34 Memory

The invention claimed is:

1. An agricultural work vehicle comprising:
   a cab including a front window and an openable rear window opposite the front window that is configurable between a closed position and an open position;
   an attachment device configured to connect a work unit to the agricultural work vehicle; and
   a camera system comprising a control unit configured to monitor a connecting process in connecting the work unit to the agricultural work vehicle, wherein the camera system includes at least one camera positioned on the rear window and directed toward the attachment device when the rear window is open, and wherein the control unit is configured to control at least one electronic device based on at least one aspect of the rear window.

2. The agricultural work vehicle of claim 1, wherein the at least one camera is positioned on an inside of the rear window.

3. The agricultural work vehicle of claim 1, wherein the rear window is configured to pivot from between the closed position and the open position by pivoting about a pivot axis;
   further comprising at least one limiting means configured to restrict the pivoting of the rear window; and
   wherein the control unit is configured to control at least one of the at least one camera or display of images generated by the at least one camera based on a pivot position of the rear window.

4. The agricultural work vehicle of claim 1, wherein the at least one camera is positioned on a portion of the rear window such that an image axis of the at least one camera is oriented in a first configuration relative to the attachment device when the rear window is in the open position and oriented in a second configuration different from the first configuration relative to the attachment device when the rear window is in the closed position.

5. The agricultural work vehicle of claim 1, wherein the at least one camera is positioned on a portion of the rear window such that an image axis of the at least one camera is oriented perpendicular or nearly perpendicular to the attachment device when the rear window is in the open position.

6. The agricultural work vehicle of claim 5, wherein the at least one camera is positioned on the portion of the rear window such that the image axis of the at least one camera is oriented parallel to ground when the rear window is in the closed position.

7. The agricultural work vehicle of claim 5, wherein the rear window is configured to pivot from between the closed position and the open position by pivoting about a pivot axis; and wherein the portion of the rear window comprises a part of the rear window opposite the pivot axis.

8. The agricultural work vehicle of claim 1, wherein the camera system includes a display device positioned in the cab;

further comprising at least one sensor configured to sense at least one aspect of the rear window; and wherein the control unit is further configured to:

analyze the sensed at least one aspect of the rear window; and control, based on the analysis, one or both of operation of the at least one camera or display of images, generated by the at least one camera, on the display device.

9. The agricultural work vehicle of claim 8, wherein the sensed at least one aspect of the rear window comprises whether the rear window is fully open.

10. The agricultural work vehicle of claim 1, wherein the control unit is configured to activate the at least one camera responsive to determining, based on sensor data, that the rear window is open and configured to deactivate the at least one camera responsive to determining, based on the sensor data, that the rear window is closed.

11. The agricultural work vehicle of claim 1, wherein the camera system includes a display device positioned in the cab and in communication with the control unit;

wherein the control unit is configured to determine at least one aspect of the rear window; and wherein the control unit is configured to control, based on the at least one aspect of the rear window, the display device in order to display images received by the at least one camera positioned on the rear window.

12. The agricultural work vehicle of claim 11, wherein the control unit is configured to control the display device in order to display images received by the at least one camera positioned on the rear window responsive to determining that the rear window is open.

13. The agricultural work vehicle of claim 12, wherein the control unit is further configured to, responsive to determining a closing of the rear window, perform one or both of controlling the display device to return to a display shown before the rear window was opened or displaying received pictures of another camera of the camera system.

14. The agricultural work vehicle of claim 11, wherein the at least one aspect of the rear window comprises a pivot angle of the rear window; and wherein the control unit is configured to control the display device in order to display images received by the at least one camera positioned on the rear window responsive to determining that the pivot angle is greater than or equal to a threshold.

15. The agricultural work vehicle of claim 11, wherein the control unit is configured to determine a distance value of the rear window to a frame element of the cab; and wherein the control unit is configured to control the display device in order to display images received by the at least one camera positioned on the rear window depending on the distance value of the rear window to a frame element of the cab.

16. The agricultural work vehicle of claim 11, wherein the control unit is further configured to, responsive to determining a closing of the rear window, perform one or both of controlling the display device to return to a display shown before the rear window was opened or displaying received pictures of another camera of the camera system, wherein the control unit is configured to, responsive to determining a closing of the rear window and determining a type of work unit connected to the agricultural work vehicle, control the display device depending on the type of work unit connected to the agricultural work vehicle to change the display device to an operation display specific to one or both of an adjustment or an operation of the work unit.

17. The agricultural work vehicle of claim 1, further comprising:

an actuating means positioned on the rear window to unlock and lock the rear window; and at least one sensor configured to detect at least one of the open position or the closed position of the rear window and to transmit a signal to the control unit of the camera system indicative of detecting the at least one of the open position or the closed position of the rear window; and wherein the control unit is configured to control one or both of the at least one camera or displaying images generated by the at least one camera based on the signal.

18. The agricultural work vehicle of claim 17, wherein the at least one sensor comprises at least one of a contact sensor or proximity sensor.

19. The agricultural work vehicle of claim 17, wherein the at least one sensor comprises a rotary sensor configured to detect pivoting of the rear window; and wherein the control unit is configured to control one or both of the at least one camera or displaying images generated by the at least one camera based on the pivoting of the rear window.

20. The agricultural work vehicle of claim 1, further comprising at least one additional camera positioned on a roof of the cab and configured to detect a rear area of the agricultural work vehicle independent of the at least one camera positioned on the rear window.

* * * * *